US011036956B2

(12) United States Patent
Li

(10) Patent No.: US 11,036,956 B2
(45) Date of Patent: Jun. 15, 2021

(54) MOBILE TERMINAL AND RADIO FREQUENCY FINGERPRINT IDENTIFICATION APPARATUS AND METHOD THEREOF

(71) Applicant: XI'AN YEP TELECOMMUNICATION TECHNOLOGY., LTD, Shaanxi (CN)

(72) Inventor: Wei Li, Shaanxi (CN)

(73) Assignee: XI'AN YEP TELECOMMUNICATION TECHNOLOGY., LTD, Xi'an (CN)

( * ) Notice: Subject to any disclaimer, the term of this patent is extended or adjusted under 35 U.S.C. 154(b) by 0 days.

(21) Appl. No.: 16/748,845

(22) Filed: Jan. 22, 2020

(65) Prior Publication Data
US 2020/0160022 A1 May 21, 2020

Related U.S. Application Data

(63) Continuation of application No. PCT/CN2017/116415, filed on Dec. 15, 2017.

(30) Foreign Application Priority Data

Aug. 2, 2017 (CN) .......................... 201710652631.5

(51) Int. Cl.
G06K 9/00 (2006.01)
G06F 1/3234 (2019.01)
G06F 3/041 (2006.01)

(52) U.S. Cl.
CPC ......... *G06K 9/0002* (2013.01); *G06F 1/3234* (2013.01); *G06F 1/3262* (2013.01); *G06F 3/0416* (2013.01)

(58) Field of Classification Search
CPC ................ G06K 9/0002; G06F 1/3234; G06F 2203/0338; G06F 3/0416; G06F 3/04166;
(Continued)

(56) References Cited

U.S. PATENT DOCUMENTS

2015/0213245 A1* 7/2015 Tartz ....................... G06F 21/32
726/17
2016/0349882 A1* 12/2016 Liu .......................... G06F 3/042

FOREIGN PATENT DOCUMENTS

CN 104850292 A 8/2015
CN 106815508 A 6/2017
(Continued)

OTHER PUBLICATIONS

International Search Report (and English translation) and Written Opinion of the International Searching Authority for International Application No. PCT/CN2017/116415 dated May 2, 2018.

*Primary Examiner* — Jonathan A Boyd
(74) *Attorney, Agent, or Firm* — Heslin Rothenberg Farley & Mesiti P.C.

(57) ABSTRACT

The present disclosure provides a mobile terminal and a radio frequency fingerprint identification apparatus and method thereof. The apparatus comprises a plurality of fingerprint identification units disposed under the touch screen, a power supply control module and a fingerprint identification control module. The touch screen of the mobile terminal is configured for obtaining area information of a finger touching area when receiving a touch operation instruction. The fingerprint identification control module is configured to generate a fingerprint identification area according to the received area information. The fingerprint identification area corresponds to at least part of the plurality of fingerprint identification units, and the at least part of the plurality of the fingerprint identification units are defined as target fingerprint identification units. The power supply
(Continued)

control module is triggered to supply power to the target fingerprint identification units so as to collect fingerprint information.

14 Claims, 7 Drawing Sheets

(58) Field of Classification Search
CPC ... G06F 3/03547; G06F 1/3262; G06F 3/0488
See application file for complete search history.

(56) References Cited

FOREIGN PATENT DOCUMENTS

| | | |
|---|---|---|
| CN | 106815548 A | 6/2017 |
| CN | 106991387 A | 7/2017 |
| CN | 107450712 A | 12/2017 |

* cited by examiner

MOBILE TERMINAL AND RADIO FREQUENCY FINGERPRINT IDENTIFICATION APPARATUS AND METHOD THEREOF

CROSS REFERENCE TO RELATED APPLICATIONS

The present application is a U.S. continuation of international patent application No. PCT/CN2017/116415, filed on Dec. 15, 2017. The international application claims the priority benefit of Chinese Patent Application No. 201710652631.5 filed on Aug. 2, 2017. The disclosure of each applications ares incorporated by reference herein in their entireties

TECHNICAL FIELD

The present disclosure relates to the technical field of electronic products, and in particular, to a mobile terminal and a radio frequency fingerprint identification apparatus and method thereof.

BACKGROUND

Implementation of radio frequency fingerprint identification in a touch screen area not only enables multi-finger fingerprint identification but also has better security performance. Therefore, more and more mobile terminals employ touch screen radio frequency fingerprint identification technology. In the Chinese patent applications No. 201480029579.2 and No. 20118005414.X, detailed solutions and practical applications for a radio frequency fingerprint identification system (including both radio wave detection and ultrasonic detection) are disclosed. However, the fingerprint identification apparatus disclosed therein has to be operated all the time as a detection sensor, and a fingerprint identification unit in the apparatus has to be powered even if it does not perform fingerprint collection, that is, the mobile terminal has to supply power to the fingerprint identification apparatus all the time, which undoubtedly increases power consumption of the mobile terminal.

SUMMARY

The technical problem to be solved by the present disclosure is to provide a mobile terminal and a radio frequency fingerprint identification apparatus and method thereof, so as to overcome the defect in the prior art of high power consumption due to that a mobile terminal has to supply power to a fingerprint identification apparatus all the time so that the fingerprint identification apparatus may operate normally.

The present disclosure solves the above technical problem by providing the following technical solutions:

A radio frequency fingerprint identification apparatus for a mobile terminal, wherein, the mobile terminal comprises a touch screen, the touch screen is configured to obtain area information of a finger touching area when receiving a touch operation instruction, and the radio frequency fingerprint identification apparatus includes a plurality of fingerprint identification units disposed under the touch screen, wherein the radio frequency fingerprint identification apparatus further includes: a power supply control module and a fingerprint identification control module;

the fingerprint identification control module is configured to receive the area information, and generate a fingerprint identification area according to the area information; wherein, the fingerprint identification area corresponds to at least part of the plurality of fingerprint identification units, and the at least part of the plurality of the fingerprint identification units are defined as target fingerprint identification units;

the fingerprint identification control module is further configured to trigger the power supply control module; and the power supply control module is configured to control the target fingerprint identification units to be powered on so as to collect fingerprint information.

In this technical solution, when a user performs fingerprint identification, only the fingerprint identification units corresponding to the fingerprint identification area are power supplied, and other fingerprint identification units are not and not required to be power supplied, thereby greatly reducing the power consumption of the radio frequency fingerprint identification apparatus.

Optionally, the power supply control module includes a power supply end, a grounding end and first switches;

an input end of a fingerprint identification unit is electrically connected to one end of one of the first switches, and the other end of the first switch is electrically connected to the power supply end; an output end of the fingerprint identification unit is electrically connected to the grounding end; or an input end of a fingerprint identification unit is electrically connected to the power supply end, an output end of the fingerprint identification unit is electrically connected to one end of one of the first switches, and the other end of the first switch is electrically connected to the grounding end;

the fingerprint identification control module is specifically configured to trigger target first switches to be switched on; wherein, the target first switch are first switches corresponding to the target fingerprint identification units.

In this technical solution, an implementation of the power supply control module is provided, which includes two circuit connection modes. In this technical solution, one switch is correspondingly set to the fingerprint identification unit, thereby realizing separate control to the power supply to each of the fingerprint identification units by controlling the switching on and off of the switch.

Optionally, the power supply control module comprises a power supply end, a grounding end, second switches and third switches;

wherein the plurality of fingerprint identification units are arranged in an array;

output ends of the fingerprint identification units in each row are electrically connected to one end of one of the second switches, and the other end of the second switch is electrically connected to the grounding end; and input ends of the fingerprint identification units in each column are electrically connected to one end of one of the third switches, and the other end of the third switch is electrically connected to the power supply end; or input ends of the fingerprint identification units in each row are electrically connected to one end of one of the second switches, and the other end of the second switch is electrically connected to the power supply end; and output ends of the fingerprint identification units in each column are electrically connected to one end of one of the third switches, and the other end of the third switch is electrically connected to the grounding end; and the fingerprint identification control module is specifically configured to trigger target second switches and target third switches to be switched on; and the target second switches are second switches corresponding to the target fingerprint identification units; and the target third switches are third switches corresponding to the target fingerprint identification units.

In this technical solution, an implementation of the power supply control module is provided, which includes two circuit connection modes. In this technical solution, separate control to the power supply to each of the fingerprint identification units is realized by controlling the switch array.

Optionally, the area information comprises coordinates of a midpoint of the finger touching area, the fingerprint identification control module is specifically configured to take a first identification area as the fingerprint identification area;

the first identification area is an area extending outward from the coordinates of the midpoint, and a distance between a boundary of the first identification area and coordinates of the midpoint is less than a first distance threshold.

Optionally, the fingerprint identification control module is further configured to determine an operation state of the mobile terminal, and take the first identification area as the fingerprint identification area when it is determined that the operation state is a standby mode.

In this technical solution, in scenarios where the accuracy for fingerprint identification is not required to be high, a rough obtaining mode for obtaining the fingerprint identification area is adopted to reduce the power consumption for calculation and scheduling, and thus reduce the overall power consumption of the apparatus.

Optionally, the area information comprises an outer contour of a touching finger;

the fingerprint identification control module is specifically configured to take a second identification area as the fingerprint identification area; and the second identification area is a minimum area covering the outer contour.

Optionally, the fingerprint identification control module is further configured to determine an operating state of the mobile terminal, and take the second identification area as the fingerprint identification area when it is determined that the operating state is a working mode.

In this technical solution, in scenarios where the accuracy for fingerprint identification is required to be high, an obtaining mode for obtaining the fingerprint identification area is adopted to improve the accuracy for fingerprint identification. In this case, although the power consumption for calculation and scheduling increases, not too much extra power will be introduced to the apparatus, as target fingerprint identification units are defined according to the outer contour of the finger.

Optionally, the touch screen is configured to obtain area information of finger touching areas touched by at least two fingers at the same time, and the area information includes coordinates of midpoints of the finger touching areas;

the fingerprint identification control module is further configured to determine whether there are target finger touching areas, wherein a distance between the coordinates of the midpoints of two of the target finger touching areas is less than a second distance threshold, and take a third identification area as the fingerprint identification area if it is determined to be yes; and the third identification area is a minimum area covering at least two target finger touching areas.

In this technical solution, when the user performs a multi-finger composite operation, the area in which the finger touch area is relatively close is combined into one fingerprint identification area, and the fingerprint identification area is scheduled to reduce the power consumption of multiple calculations and scheduling.

And/or, the touch screen includes a plurality of pixel units arranged in an array; and at least one fingerprint identification unit is disposed under each of the pixel units.

This technical solution may improve the accuracy of fingerprint identification.

Optionally, the fingerprint identification control module is further configured to count the number of times that the first switches are switched on within a threshold for time period, and control the first switches to be normally on if the number of times is greater than a threshold for number of times and cancel the normally on if the number of times is less than or equal to the threshold for number of times.

In this technical solution, when the user frequently performing operations in one or several certain areas, considering that frequent switching on and off the first switches would increase power consumption for calculation and scheduling of the apparatus, the first switches are set to be normally switched on to reduce the power consumption for calculation and scheduling, so as to optimize the power consumption for scheduling and the power consumption of the fingerprint identification units, and thus minimizing the power consumption of the whole apparatus.

Optionally, the fingerprint identification control module is further configured to count the number of times that the second switches and the third switches are switched on within a threshold for time period, and control the second switches and the third switches to be normally on if the number of times is greater than a threshold for the number of time, and cancel the normally on if the number of times is less than or equal to the threshold for number of times.

In this technical solution, when the user frequently performing operations in one or several certain areas, considering that frequent switching on and off the second switches and the third switches would increase power consumption for calculation and scheduling of the apparatus, the second switches and the third switches are set to be normally switched on to reduce the power consumption for calculation and scheduling, so as to optimize the power consumption for scheduling and the power consumption of the fingerprint identification units, and thus minimizing the power consumption of the whole apparatus.

The present disclosure also provides a mobile terminal comprising the radio frequency fingerprint identification apparatus as described above.

The present disclosure also provides a radio frequency fingerprint identification method for a mobile terminal, the mobile terminal comprises a touch screen, and a plurality of fingerprint identification units are disposed under the touch screen, wherein the radio frequency fingerprint identification method comprises steps of:

setting a power supply control module;

obtaining area information of a finger touching area on the touch screen, when receiving a touch operation instruction;

generating a fingerprint identification area according to the area information, wherein, the fingerprint identification area corresponds to at least part of the plurality of fingerprint identification units, and the at least part of the plurality of the fingerprint identification units are defined as target fingerprint identification units; and triggering the power supply control module, so that the power supply control module controls the target fingerprint identification units to be powered on so as to collect fingerprint information.

In this technical solution, when a user performs fingerprint identification, only the fingerprint identification units corresponding to the fingerprint identification area are power supplied, and other fingerprint identification units are not and not required to be power supplied, thereby greatly reducing the power consumption of the radio frequency fingerprint identification apparatus.

the power supply control module comprises a power supply end, a grounding end and first switches;

an input end of a fingerprint identification unit is electrically connected to one end of one of the first switches, and the other end of the first switch is electrically connected to the power supply end; an output end of the fingerprint identification unit is electrically connected to the grounding end; or an input end of a fingerprint identification unit is electrically connected to the power supply end, an output end of the fingerprint identification unit is electrically connected to one end of one of the first switches, and the other end of the first switch is electrically connected to the grounding end;

the step of triggering the power supply control module specifically comprises: triggering the target first switches to be switched on; wherein, the target first switch are first switches corresponding to the target fingerprint identification units.

In this technical solution, an implementation of the power supply control module is provided, which includes two circuit connection modes. In this technical solution, one switch is correspondingly set to the fingerprint identification unit, thereby realizing separate control to the power supply to each of the fingerprint identification units by controlling the switching on and off of the switch.

Optionally, the power supply control module comprises a power supply end, a grounding end, second switches and third switches;

wherein the plurality of fingerprint identification units are arranged in an array;

output ends of the fingerprint identification units in each row are electrically connected to one end of one of the second switches, and the other end of the second switch is electrically connected to the grounding end; and input ends of the fingerprint identification units in each column are electrically connected to one end of one of the third switches, and the other end of the third switch is electrically connected to the power supply end; or input ends of the fingerprint identification units in each row are electrically connected to one end of one of the second switches, and the other end of the second switch is electrically connected to the power supply end; and output ends of the fingerprint identification units in each column are electrically connected to one end of one of the third switches, and the other end of the third switch is electrically connected to the grounding end; and the step of triggering the power supply control module specifically comprises: triggering target second switches and target third switches to be switched on; and the target second switches are second switches corresponding to the target fingerprint identification units; and the target third switches are third switches corresponding to the target fingerprint identification units.

In this technical solution, an implementation of the power supply control module is provided, which includes two circuit connection modes. In this technical solution, separate control to the power supply to each of the fingerprint identification units is realized by controlling the switch array.

Optionally, the area information comprises coordinates of a midpoint of the finger touching area, the step of generating a fingerprint identification area according to the area information specifically comprises:

taking a first identification area as the fingerprint identification area;

wherein, the first identification area is an area extending outward from the coordinates of the midpoint, and a distance between a boundary of the first identification area and the coordinates of the midpoint is less than a first distance threshold.

Optionally, the method further comprises performing the following step before generating a fingerprint identification area according to the area information: determining an operation state of the mobile terminal, and taking the first identification area as the fingerprint identification area when it is determined that the operation state is a standby mode.

In this technical solution, in scenarios where the accuracy for fingerprint identification is not required to be high, a rough obtaining mode for obtaining the fingerprint identification area is adopted to reduce the power consumption for calculation and scheduling, and thus reduce the overall power consumption of the apparatus.

Optionally, the area information comprises an outer contour of a touching finger;

the step of generating a fingerprint identification area according to the area information specifically comprises taking a second identification area as the fingerprint identification area; wherein, the second identification area is a minimum area covering the outer contour;

Optionally, the method further comprises performing the following step before generating a fingerprint identification area according to according to the area information: determining an operating state of the mobile terminal, and taking the second identification area as the fingerprint identification area when it is determined that the operating state is a working mode.

In this technical solution, in scenarios where the accuracy for fingerprint identification is required to be high, an obtaining mode for obtaining the fingerprint identification area is adopted to improve the accuracy for fingerprint identification. In this case, although the power consumption for calculations and scheduling increases, not too much extra power will be introduced to the apparatus, as target fingerprint identification units are defined according to the outer contour of the finger.

Optionally, the method further comprising obtaining area information of finger touching areas touched by at least two fingers at the same time, wherein the area information includes coordinates of midpoints of the finger touching areas;

wherein, the method further comprises performing the following steps before the step of generating a fingerprint identification area according to the area information:

determining whether there are target finger touching areas, wherein a distance between the coordinates of the midpoints of two of the target finger touching areas is less than a second distance threshold, and taking a third identification area as the fingerprint identification area if it is determined to be yes;

the third identification area is a minimum area covering at least two target finger touching areas.

In this technical solution, when the user performs a multi-finger composite operation, the area in which the finger touch area is relatively close is combined into one fingerprint identification area, and the fingerprint identification area is scheduled to reduce the power consumption of multiple calculations and scheduling.

Optionally, the radio frequency fingerprint identification method further includes:

counting the number of times that the first switches are switched on within a threshold for time period, and controlling the first switches to be normally on if the number of times is greater than a threshold for number of times and cancelling the normally on if the number of times is less than or equal to the threshold for number of times.

In this technical solution, when the user frequently performing operations in one or several certain areas, considering that frequent switching on and off the first switches would increase power consumption for calculation and scheduling of the apparatus, the first switches are set to be normally switched on to reduce the power consumption for calculation and scheduling, so as to optimize the power consumption for scheduling and the power consumption of the fingerprint identification units, and thus minimizing the power consumption of the whole apparatus.

Optionally, the radio frequency fingerprint identification method further includes:

counting the number of times that the second switches and the third switches are switched on within a threshold for time period, and control the second switches and the third switches to be normally on if the number of times is greater than a threshold for the number of time, and cancel the normally on if the number of times is less than or equal to the threshold for number of times.

In this technical solution, when the user frequently performing operations in one or several certain areas, considering that frequent switching on and off the second switches and the third switches would increase power consumption for calculation and scheduling of the apparatus, the second switches and the third switches are set to be normally switched on to reduce the power consumption for calculation and scheduling, so as to optimize the power consumption for scheduling and the power consumption of the fingerprint identification units, and thus minimizing the power consumption of the whole apparatus.

The advantageous effects provided by the present disclosure comprises that when a user performs fingerprint identification, only the fingerprint identification units corresponding to the fingerprint identification area are power supplied, and other fingerprint identification units are not and not required to be power supplied, thereby greatly reducing the power consumption of the radio frequency fingerprint identification apparatus.

DETAILED DESCRIPTION

The present invention is further illustrated by the following embodiments, however, the present invention shall not be considered as being limited in the scope of these embodiments.

Figure 1:
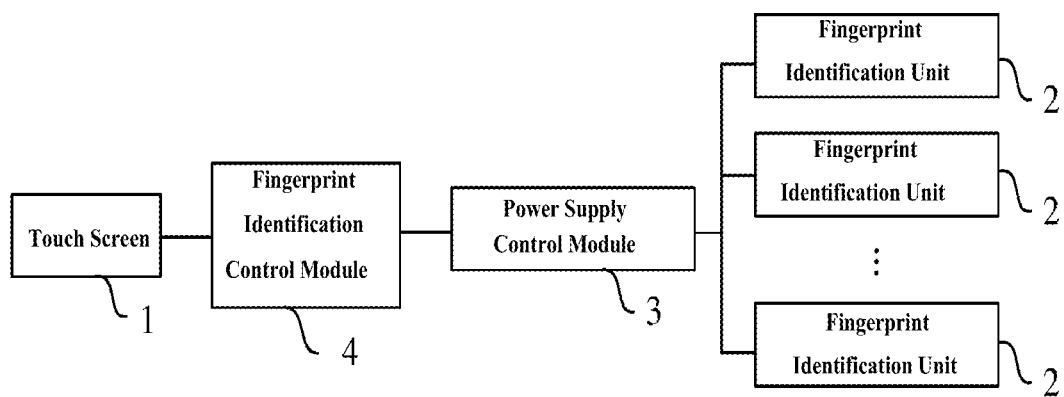
FIG. 1 is a schematic diagram illustrating modules of a radio frequency fingerprint identification apparatus according to an embodiment of the present disclosure.

FIG. 1 is a schematic diagram illustrating modules of a radio frequency fingerprint identification apparatus according to an embodiment of the present disclosure. As shown in FIG. 1, the radio frequency fingerprint identification apparatus of the present embodiment may be applied to a mobile terminal, and the mobile terminal comprises a touch screen 1 which includes a plurality of pixel units arranged in an array. The radio frequency fingerprint identification apparatus includes a plurality of fingerprint identification units 2 disposed under the touch screen 1, a power supply control module 3, and a fingerprint identification control module 4. The fingerprint identification control module 4 is electrically connected to the power supply control module 3 and the touch screen 1, respectively, and the power supply control module 3 is also electrically connected to the fingerprint identification units 2.

Alternatively, the power supply control module 3 may control the power supplying of the fingerprint identification units 2 only; and the power supplying of the touch screen may be controlled by other power supply control units. That is to say, there is another implementation in which the power supply control module 3 and the touch screen 1 in FIG. 1 are not directly/indirectly connected with each other.

The operating principle of the radio frequency fingerprint identification apparatus in this embodiment will be described as below:

If a user performs the fingerprint identification function, he or she may touch on the touch screen 1 with a finger, and the touch screen 1 obtains area information of a finger touching area when receiving a touch operation instruction and sends the area information to the fingerprint identification control module 4. The area information includes position information of the finger touching area, for example, coordinates of a midpoint of the finger touching area, boundary point coordinates of the finger touching area, coordinates of respective pixel units in the finger touching area, and the like. The fingerprint identification control module 4 generates a fingerprint identification area based on the area information. The fingerprint identification area corresponds to at least part of the plurality of fingerprint identification units, and the at least part of the plurality of fingerprint identification units are defined as target fingerprint identification units, that is to say, the target fingerprint identification units corresponding to the fingerprint identification area are fingerprint identification units that are required to be operated normally to perform fingerprint collection. The fingerprint identification control module 4 triggers the power supply control module 3, and the power supply control module 3 controls the target fingerprint identification units to be powered on so that the target fingerprint identification units collect fingerprint information and thereby implement fingerprint identification.

In this embodiment, in order to make the fingerprint identification area correspond to the at least part of the plurality of fingerprint identification units, and define the at least part of the plurality of the fingerprint identification units as the target fingerprint identification units, the following operations are performed: firstly, pre-storing a mapping relationship between each pixel unit in the touch screen and the fingerprint identification units; then, after obtaining the area information, determining coordinates of the pixel units in the fingerprint identification area according to the area information; and next, taking fingerprint identification units corresponding to the fingerprint identification area as the target fingerprint identification units.

In this embodiment, when a user performs fingerprint identification, only the fingerprint identification units corresponding to the fingerprint identification area are power supplied, and other fingerprint identification units are not and not required to be power supplied, thereby greatly reducing the power consumption of the radio frequency fingerprint identification apparatus.

Figure 2:
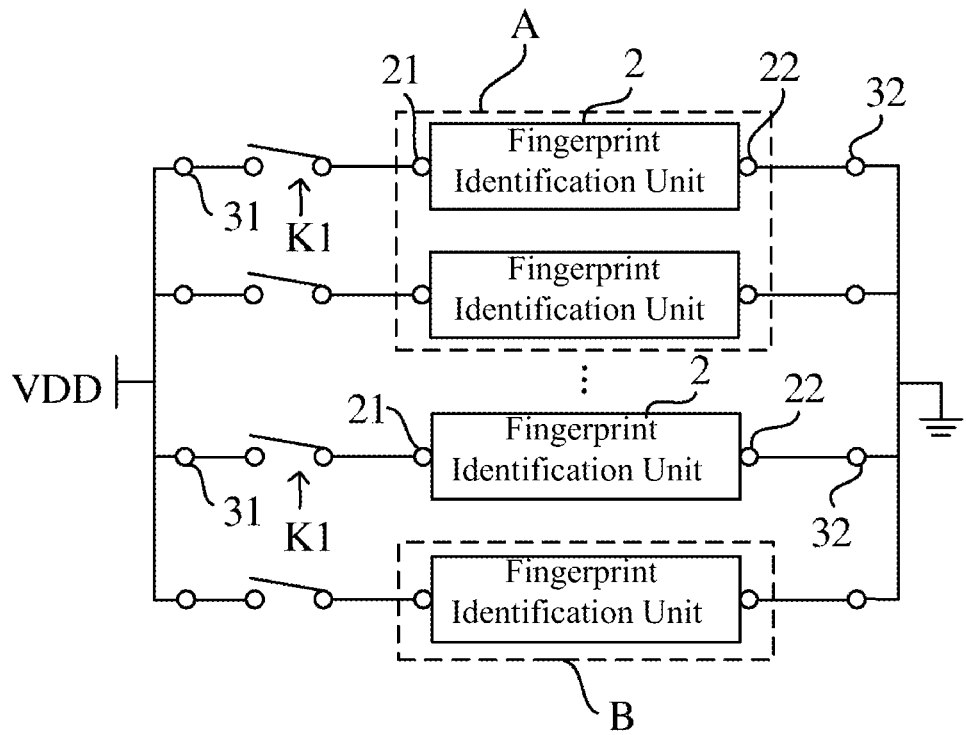
FIG. 2 is a diagram illustrating circuit connection of a power supply control module and a fingerprint identification unit in a radio frequency fingerprint identification apparatus according to an embodiment of the present disclosure.

FIG. 2 is a diagram illustrating circuit connection of a power supply control module and a fingerprint identification unit in a radio frequency fingerprint identification apparatus according to an embodiment of the present disclosure. As shown in FIG. 2, the power supply control module of this embodiment includes a power supply end 31, a grounding end 32, and first switches K1. In this embodiment, each of the fingerprint identification units corresponds to one first switch, and the specific circuit connection are described as follows: an input end 21 of the fingerprint identification unit 2 is electrically connected to one end of one of the first switches K1, and the other end of the first switch K1 is electrically connected to the power supply end 31; and an output end 22 of the fingerprint identification unit 2 is electrically connected to the grounding end 32. The grounding end is grounded, and the power supply end may be electrically connected to a power supply, or each of the power supply ends is electrically connected to a corresponding one of power supplies.

In this embodiment, the rules for arranging the fingerprint identification units are not limited, and the fingerprint identification units may be arranged regularly or irregularly. Of course, in order to improve the accuracy of fingerprint identification, preferably, at least one fingerprint identification unit is disposed under each pixel unit of the touch screen. It should be noted that, in principle, the more the fingerprint identification units disposed under each pixel unit are, the higher the accuracy of fingerprint identification is. However, when specifically setting the number of the fingerprint identification units, other conditions may also be taken into consideration, such as, calculation capacity, power consumption and production cost of the mobile terminal, etc.

In this embodiment, the fingerprint identification control module realizes power supply to the target fingerprint identification units by triggering target first switches to be switched on, and then the target fingerprint identification units may perform fingerprint information collection. The target first switches are first switches corresponding to the target fingerprint identification units. Specifically, referring to FIG. 2, at the current moment, if an area A is the fingerprint identification area (the person skilled in the art should understand that the shape of the fingerprint identification area is only exemplarily illustrated herein, which shall not be limited to a rectangle, which may also be a circle, an oval, etc.), the fingerprint identification units in the area A are the target fingerprint identification units, and the first switches corresponding to the target fingerprint identification units (that is, the first switches electrically connected to the target fingerprint identification units) are the target first switches. The fingerprint identification control module triggers the target first switches to be switched on (and other first switches remain to be switched off), and at this time, the target fingerprint identification units are electrically connected to a power supply VDD, and thus the VDD has two complete current paths to the ground, so that the power supply VDD supplies power to two target fingerprint identification units in the area A, and thus the target fingerprint identification units may operate normally to perform fingerprint information collection. At the next moment, if an area B is the fingerprint identification area and the area A is no longer the fingerprint identification area, the fingerprint identification control module takes fingerprint identification units in the area B as the target fingerprint identification units, and triggers first switches corresponding to the target fingerprint identification units in the area B to be switched on, and switches off the first switches corresponding to the fingerprint identification units in the area A, so that the power supply supplies power to the fingerprint identification units in the area B only. In this embodiment, individual control to the power supply of the fingerprint identification units is realized by providing a corresponding first switch for each of the fingerprint identification units. Therefore, when performing fingerprint identification, only the target fingerprint identification units are power supplied, which greatly reducing the power consumption for radio frequency fingerprint identification.

It should be noted that, in the above embodiment, a power supply of the mobile terminal may be used as the power supply VDD, or another power supply may be separately provided as the power supply VDD.

In actual applications, the user may frequently perform operations on one or several certain areas of the screen, and thus the fingerprint identification control module has to switch on and switch off the switches frequently, which may increase power consumption for calculation and scheduling. In this embodiment, in order to optimize the power consumption for system scheduling and power consumption of the fingerprint identification unit so as to minimizes the power consumption of the whole apparatus, the fingerprint identification control module is further configured to count the number of times that the first switches are switched on within a threshold for time period, and control the first switches to be normally on if the number of times is greater than a threshold for number of times so as to minimize the power consumption of the whole apparatus, and cancel the normally on if the number of times is less than or equal to the threshold for number of times. It should be noted that the threshold for the time period and the threshold for number of times may be set according to actual needs.

Figure 3:
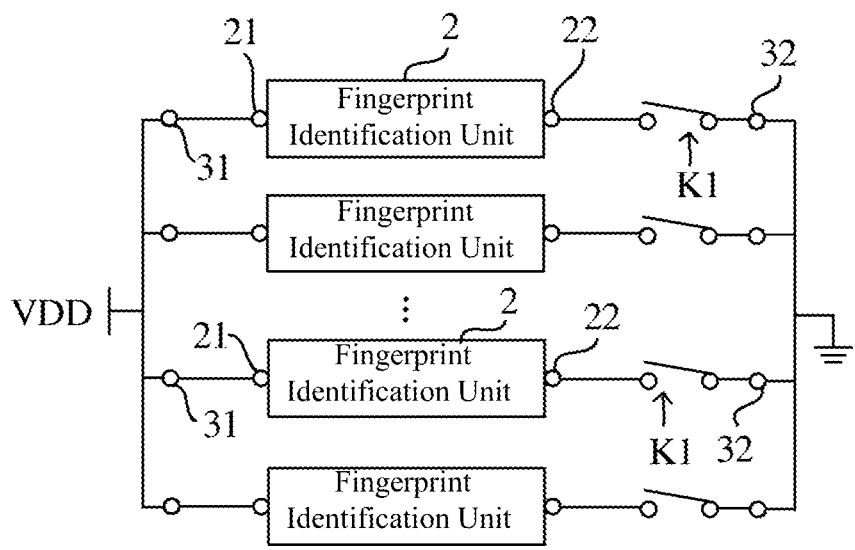
FIG. 3 is a schematic diagram illustrating circuit connection of a power supply control module and a fingerprint identification unit in another radio frequency fingerprint identification apparatus according to an embodiment of the present disclosure.

FIG. 3 is a schematic diagram illustrating circuit connection of a power supply control module and a fingerprint identification unit in a radio frequency fingerprint identification apparatus according to another embodiment of the present disclosure. As shown in FIG. 3, this embodiment is substantially the same as that of FIG. 2, except the specific circuit connection of the power supply control module. In this embodiment, the input end 21 of the fingerprint identification unit 2 is electrically connected to the power supply end 31, and the output end 22 of the fingerprint identification unit 2 is electrically connected to one end of one of the first switches, and the other end of the first switch is electrically connected to the grounding end 32.

In this embodiment, the principle for the fingerprint identification control module to control the switching on and off of the first switches is basically the same as that of the circuit shown in FIG. 2, and the details thereof are not omitted herein.

Figure 4:
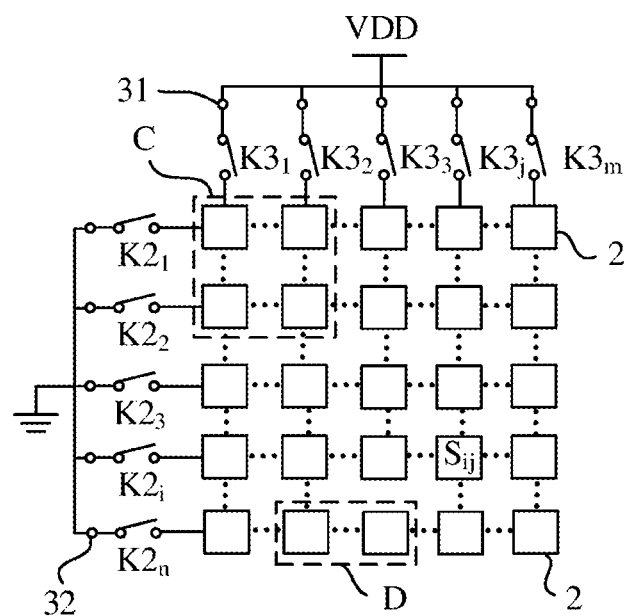
FIG. 4 is a schematic diagram illustrating circuit connection of a power supply control module and a fingerprint identification unit in another radio frequency fingerprint identification apparatus according to an embodiment of the present disclosure.

FIG. 4 is a schematic diagram illustrating circuit connection of a power supply control module and a fingerprint identification unit in yet another radio frequency fingerprint identification apparatus according to an embodiment of the present disclosure. As shown in FIG. 4, the power supply control module of this embodiment includes a power supply end 31, a grounding end 32, second switches K2, and third switches K3. In this embodiment, the plurality of fingerprint identification units are arranged in an array, and the fingerprint identification units located in the same row correspond to the same second switch, and the fingerprint identification units located in the same column correspond to the same third switch. Specifically, output ends of the fingerprint identification units 2 in each row are electrically connected to one end of one of the second switches K2, and the other end of the second switch K2 is electrically connected to the grounding end 32; and input ends of the fingerprint identification units 2 in each column are electrically connected to one end of one of the third switches K3, and the other end of the third switch K3 is electrically connected to the power supply end 31. The grounding end is grounded, and the power supply end may be electrically connected to a power supply, or each of the power supply ends is electrically connected to a corresponding one of power supplies.

In this embodiment, the fingerprint identification control module realizes separate control to the powering on or off each of the fingerprint identification units by triggering the second switches and the third switches to be switched on or off. Specifically, the fingerprint identification control module triggers target second switches and target third switches to be switched on, so as to enable the power supply to the target fingerprint identification units. The target second switches are second switches corresponding to the target fingerprint identification units, and the target third switches are third switches corresponding to the target fingerprint identification units.

In this embodiment, in order to facilitate description, the rows are numbered as 1, 2, . . . , n, and the corresponding second switches are numbered as $K2_1$, $K2_2$, . . . , $K2_i$, . . . , $K2_n$; similarly, the columns are numbered as 1, 2, . . . , j, . . . , m, and the corresponding third switches are numbered as $K3_1$, $K3_2$, . . . , $K3_j$, . . . , $K3_m$; and the fingerprint identification unit in row i and column j is denoted by $S_{ij}$. Thus, separate control to the power supply to each of the fingerprint identification units is realized by the power supply switch array (n*1 second switches) and the grounding switch array (1*m third switches). For example, if $K2_1$ and $K3_1$ are triggered to be switched on, the power supply may supply power to $S_{11}$; and if $K2_n$, $K3_2$, and $K3_3$ are triggered to be switched on, the power supply may supply power to $S_{n2}$ and $S_{n3}$. In the following, the switch control mechanism of this embodiment will be described by taking a specific example:

Referring to FIG. 4, if an area C is the fingerprint identification area at the current moment, the fingerprint identification units $S_{11}$, $S_{12}$, $S_{21}$, and $S_{22}$ in the area C are the target fingerprint identification units. In order to make the target fingerprint identification units operate normally, the fingerprint identification control module triggers second switches $K2_1$, $K2_2$ and the third switches $K3_1$, $K3_2$ to be switched on, thereby the power supply VDD supplies power to the target fingerprint identification units. At the next moment, if an area D is the fingerprint identification area and the area C is no longer the fingerprint identification area, the fingerprint identification control module triggers a second switch $K2_n$ and third switches $K3_2$ and $K3_3$ corresponding to the fingerprint identification units $S_{n2}$ and $S_{n3}$ in the area D to be switched on, and switches off the second switches and the third switches corresponding to the fingerprint identification units in the area C, so as to enable the operation of the fingerprint identification units in the fingerprint identification area, and disable the operation of the fingerprint identification units in the non-fingerprint identification area. By adopting the power supply switch array and the grounding switch array, this embodiment ensures that each of the fingerprint identification units is controlled by only one pair of switches (the pair of switches is composed of one second switch and one third switch). Besides, as compared with the circuit shown in FIG. 2 or FIG. 3, the number of the switches in the present embodiment is greatly reduced, and thus not only the production cost is reduced, but also the layout of the radio frequency fingerprint identification apparatus is simplified.

Similarly, in this embodiment, the fingerprint identification control module is further configured to count the number of times that the second switches and the third switches are switched on within a threshold for time period, and control the second switches and the third switches to be normally switched on of the number of times is greater than a threshold for number of times; and cancel the normally on when the number of times is less than or equal to the threshold for number of times, so as to optimize the power consumption for system scheduling and the power consumption of the fingerprint identification units, and thus minimizing the power consumption of the whole apparatus.

Figure 5:
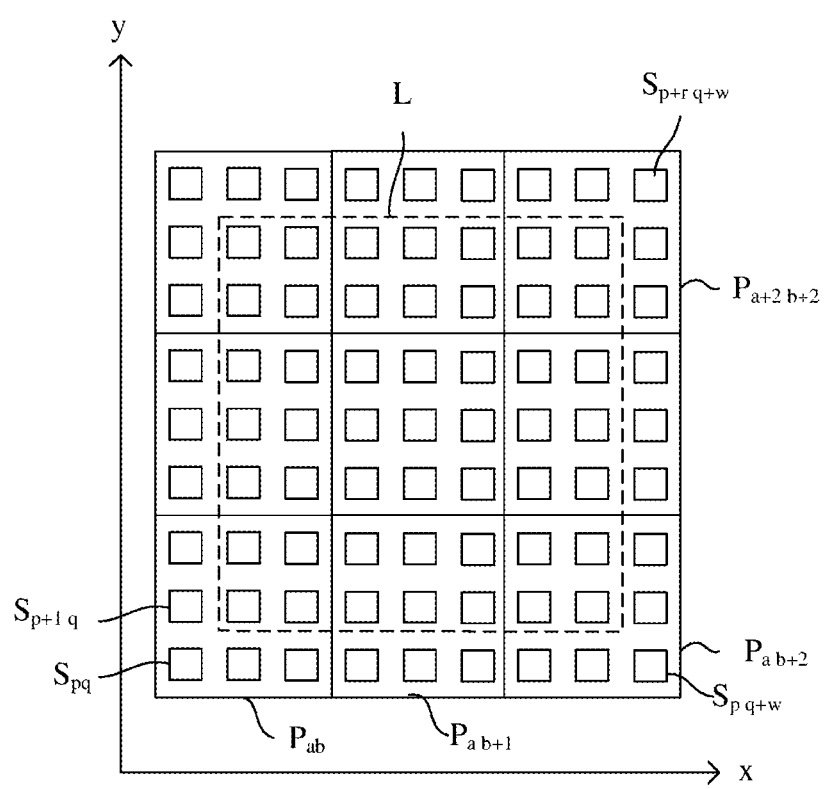
FIG. 5 is a schematic diagram illustrating a mapping relationship between a radio frequency fingerprint identification unit and a pixel unit in a radio frequency fingerprint identification apparatus according to an embodiment of the present disclosure.

It should be noted that the mapping relationship between the radio frequency fingerprint identification units in a refined array arrangement and the pixel units of the touch screen is a core factor for implementing the embodiment. In this embodiment, the mapping relationship between the pixel units and the fingerprint identification units is represented by coordinates. As shown in FIG. 5, the pixel units of the touch screen are arranged in an array, and the position information of the pixel unit P and the position information of the fingerprint identification unit S are represented in the same coordinate system. If the resolution of the touch screen is the same as that of the fingerprint identification array (one fingerprint identification unit is disposed under each pixel unit), the coordinates of each pixel unit correspond to the coordinates of one fingerprint identification unit; if the resolution of the fingerprint identification array is higher than that of the touch screen (at least two fingerprint identification units are disposed under each pixel unit), the coordinates of each pixel unit correspond to the coordinates of at least two fingerprint identification units. Referring to FIG. 5, if nine fingerprint identification units S are disposed under each pixel unit P, the coordinates $(x_a, y_b)$ of the pixel unit $P_{ab}$ correspond to the coordinates of the nine fingerprint identification units $(x_p, y_q)$, $(x_{p+1}, y_q)$, $(x_{p+2}, y_q)$, $(x_p, y_{q+1})$, . . . , $(x_{p+2}, y_{q+2})$. Where, "a" denotes the a-th row in the pixel array; "b" denotes the b-th column in the pixel array; "$x_a$" denotes the abscissa of $P_{ab}$; $y_b$ denotes the ordinate of $P_{ab}$; "p", "p+1", . . . , "p+r" denote the p-th row, the p+1-th row, . . . , the p+r-th row in the fingerprint identification array, respectively; "q", "q+1", . . . , "q+w" denote the q-th column, the q+1-th column, . . . , q+w-th column in the fingerprint identification array, respectively; "$x_p$" denotes the abscissa of $S_{pq}$; and "$y_q$" denotes the ordinate of $S_{pq}$. Those skilled in the art would know the meaning of $x_{p+1}, y_q, x_{p+2}, y_q, x_p, y_{q+1}, \ldots, x_{p+2}, y_{q+2}$, and thus the description thereof will be omitted herein.

Figure 6:
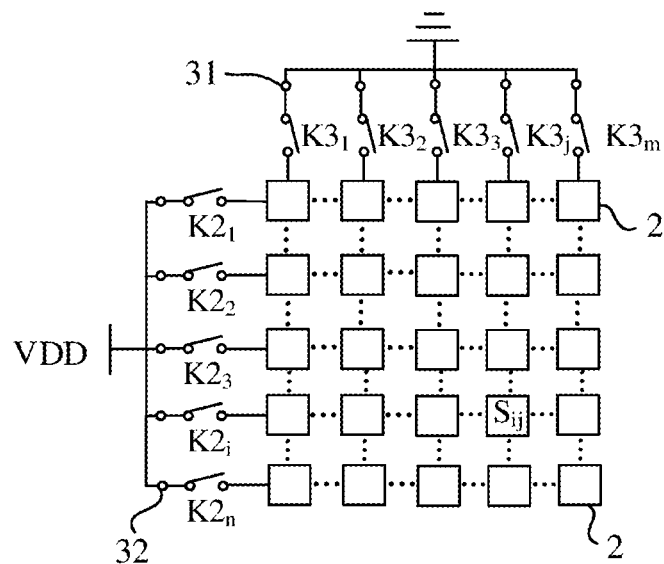
FIG. 6 is a schematic diagram illustrating circuit connection of a power supply control module and a fingerprint identification unit in another radio frequency fingerprint identification apparatus according to an embodiment of the present disclosure.

FIG. 6 is a schematic diagram illustrating circuit connection of a power supply control module and a fingerprint identification unit in radio frequency fingerprint identification apparatus according to another embodiment of the present disclosure. As shown in FIG. 6, this embodiment is substantially the same as that shown in FIG. 4, except the specific circuit connection for the power supply control module. In this embodiment, input ends of the fingerprint identification units in each row are electrically connected to one end of one of the second switches, and the other end of the second switch is electrically connected to the power supply end 32; output ends of the fingerprint identification units in each column are electrically connected to one end of one of the third switches, and the other end of the third switch is electrically connected to the grounding end 31.

In this embodiment, the principle for the fingerprint identification control module to control the switching on and off of the second switches and the third switches is basically the same as that of the circuit shown in FIG. 4, and the details thereof are not omitted herein.

In the present disclosure, before controlling the power supply control module to supply power to the target fingerprint identification units, the fingerprint identification control module selects the mode for obtaining the fingerprint identification area (including a rough obtaining mode and an accurate obtaining mode), by determining an operation state of the mobile terminal. Specifically:

If the fingerprint identification control module determines that the operation state is a standby mode, a rough obtaining mode for roughly obtaining the fingerprint identification area is selected, and the fingerprint identification control module takes a first identification area as the fingerprint identification area at this time. The area information of the finger touching area includes the coordinates of a midpoint of the finger touching area, and the first identification area is an area extending outward from the coordinates of the midpoint (as shown in FIG. 5, if the touch screen identifies $P_{a+1b+1}$ as a midpoint of the finger touching area at this time, an area extending outward from the coordinates of the midpoint $(x_a, y_{b+1})$, such as extending outward by 20 mm*20 mm (that is, the area L in FIG. 5) is taken as the first identification area), and the distance between the boundary of the first identification area and the coordinates of the midpoint is smaller than a first distance threshold (the first distance threshold may be set according to actual needs). Of course, the area extending outward may be of a circular shape or a square shape, or may be of any other shape, which is not limited thereto. It should be noted that the rough obtaining mode for obtaining the fingerprint identification area is suitable for cases that the mobile terminals do not have higher requirement on the accuracy of fingerprint identification, for example, switching the mobile terminal from the standby mode to the working mode by fingerprint identification. After obtaining fingerprint information, the fingerprint identification control module compares the collected fingerprint information with the pre-stored fingerprint information to determine if they are matched. If they are matched, the mobile terminal would enter into a main interface to implement mode switching. If they are not matched, the standby mode is maintained. In the standby mode, the rough obtaining mode is mainly adopted to reduce the power consumption for calculation and resource scheduling, and thus reducing the overall power consumption of the apparatus while ensuring the accuracy of the corresponding fingerprint identification.

If the fingerprint identification control module determines that the operation state is a working mode, an accurate obtaining mode for obtaining the fingerprint identification area is selected. At this time, the fingerprint identification control module takes a second identification area as the fingerprint identification area. Area information of the finger touching area includes an outer contour of a touching finger, and the second identification area is a minimum area covering the outer contour. The accurate obtaining mode for obtaining the fingerprint identification area is suitable for cases that the mobile terminals have higher requirement on the accuracy of the fingerprint identification, such as operations on application software when the mobile terminal is operating normally. In this mode, the target fingerprint identification units may be accurately defined according to the outer contour of the finger, and the target fingerprint identification units are controlled to be operated and the non-target fingerprint identification units are controlled to be idle, so that the accuracy of fingerprint identification is improved, and not too much extra power are introduced to the apparatus.

In this embodiment, the video fingerprint identification apparatus may also perform a multi-finger composite operation, that is, obtaining a plurality of fingerprint identification areas at the same time. In fact, the control to the power supply of the target fingerprint identification units in each fingerprint identification area when performing the multi-finger composite operation is the same as that when performing the single finger operation, and thus the control principle for the multi-finger fingerprint identification will not be described herein. However, when performing the multi-finger composite operation, if the areas touched by fingers are relatively close, they may be combined into one fingerprint identification area to reduce the power consumption for multiple calculations and scheduling. In the following, the method for optimizing the power consumption of the multi-finger composite operation are described in details as follows:

If the touch screen obtains area information of finger touching areas touched by at least two fingers at the same time, the area information including coordinates of midpoints of the finger touching areas, the fingerprint identification control module is further configured to determine whether there are target finger touching areas in which a distance between the coordinates of the midpoints of two of the target finger touching areas is less than a second distance threshold, and when it is determined to be yes, a third identification area is taken as the fingerprint identification area, wherein, the third identification area is a minimum area covering at least two target finger touching areas. After a number of tests, the second distance threshold is preferably to be set to be within 20 mm to 30 mm.

Figure 7:
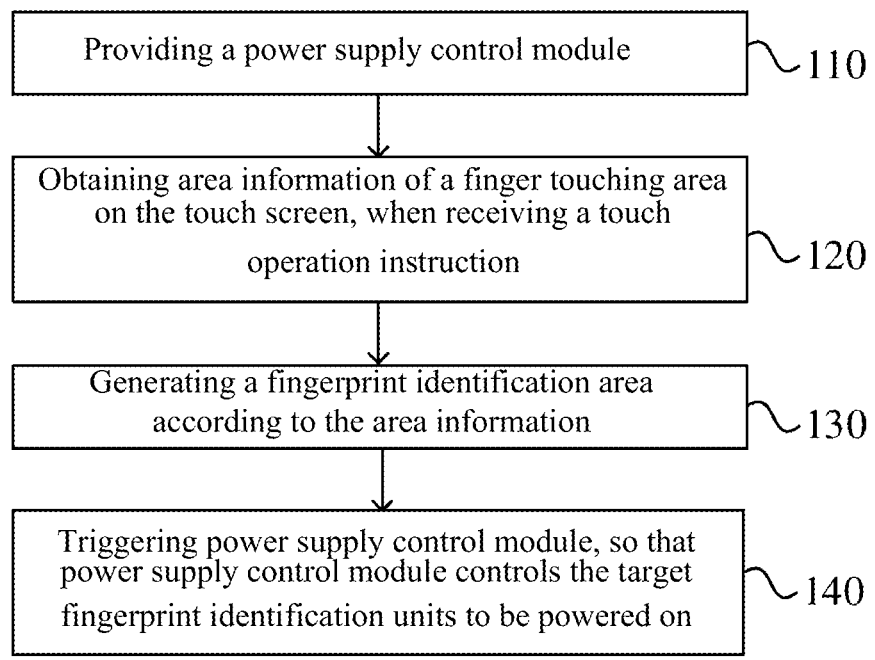
FIG. 7 is a flowchart for a radio frequency fingerprint identification method according to an embodiment of the present disclosure.

FIG. 7 is a flowchart for a radio frequency fingerprint identification method according to an embodiment of the present disclosure. The radio frequency fingerprint identification method of this embodiment is applied to a mobile terminal. The mobile terminal includes a touch screen, and a plurality of fingerprint identification units are disposed under the touch screen. As shown in FIG. 7, the radio frequency fingerprint identification method includes the following steps:

Step 110: providing a power supply control module.

Step 120: obtaining area information of a finger touching area on the touch screen, when receiving a touch operation instruction.

Step 130: generating a fingerprint identification area according to the area information.

The fingerprint identification area corresponds to at least part of the plurality of fingerprint identification units, and the at least part of the plurality of the fingerprint identification units are defined as target fingerprint identification units.

Step 140: triggering the power supply control module, so that the power supply control module controls the target fingerprint identification units to be powered on so as to collect fingerprint information.

In this embodiment, when a user performs fingerprint identification, only the fingerprint identification units corresponding to the fingerprint identification area are power supplied, and other fingerprint identification units are not and not required to be power supplied, thereby greatly reducing the power consumption of the radio frequency fingerprint identification apparatus.

In this embodiment, a specific implementation for the power supply control module in step 110 is provided:

The power supply control module comprises a power supply end, a grounding end and first switches. There are two circuit connection ways for the power supply control module: (1) an input end of a fingerprint identification unit is electrically connected to one end of one of the first switches, and the other end of the first switch is electrically connected to the power supply end; an output end of the fingerprint identification unit is electrically connected to the grounding end; (2) an input end of a fingerprint identification unit is electrically connected to the power supply end, an output end of the fingerprint identification unit is electrically connected to one end of one of the first switches, and the other end of the first switch is electrically connected to the grounding end.

Figure 8:
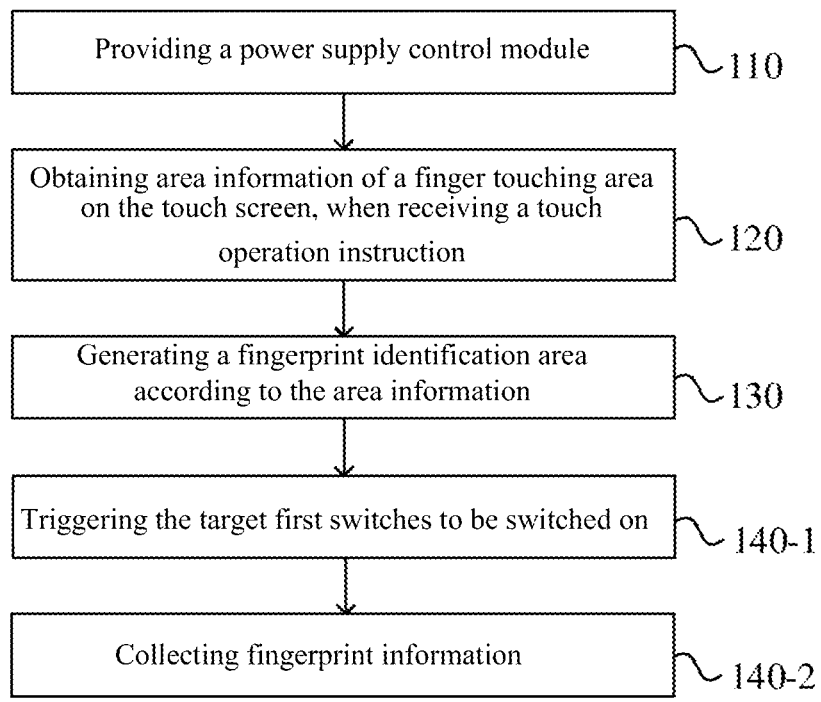
FIG. 8 is a flowchart for another radio frequency fingerprint identification method according to an embodiment of the present disclosure.

As shown in FIG. 8, step 140 specifically includes:

Step 140-1, triggering the target first switches to be switched on.

The target first switch are first switches corresponding to the target fingerprint identification units.

Step 140-2, collecting fingerprint information.

In this embodiment, by providing a corresponding first switch for each of the fingerprint identification units, separate control to the power supply to the fingerprint identification unit is realized. Therefore, when performing fingerprint identification, only the target fingerprint identification units are power supplied, thereby greatly reducing the power consumption of the radio frequency fingerprint identification apparatus.

In this embodiment, the radio frequency fingerprint identification method further includes:

counting the number of times that the first switches are switched on within a threshold for time period, and controlling the first switches to be normally on if the number of times is greater than a threshold for number of times and cancelling the normally on if the number of times is less than or equal to the threshold for number of times. In this way, the power consumption for calculation and scheduling of the apparatus is reduced, and the overall power consumption is minimized.

This embodiment further provides another specific implementation of the power supply control module in step 110:

The power supply control module includes a power supply end, a grounding end, second switches, and third switches; and the plurality of fingerprint identification units are arranged in an array. There are two circuit connection ways for the power supply control module: (1) output ends of the fingerprint identification units in each row are electrically connected to one end of one of the second switches, and the other end of the second switch is electrically connected to the grounding end; and input ends of the fingerprint identification units in each column are electrically connected to one end of one of the third switches, and the other end of the third switch is electrically connected to the power supply end; and (2) input ends of the fingerprint identification units in each row are electrically connected to one end of one of the second switches, and the other end of the second switch is electrically connected to the power supply end; and output ends of the fingerprint identification units in each column are electrically connected to one end of one of the third switches, and the other end of the third switch is electrically connected to the grounding end.

Figure 9:
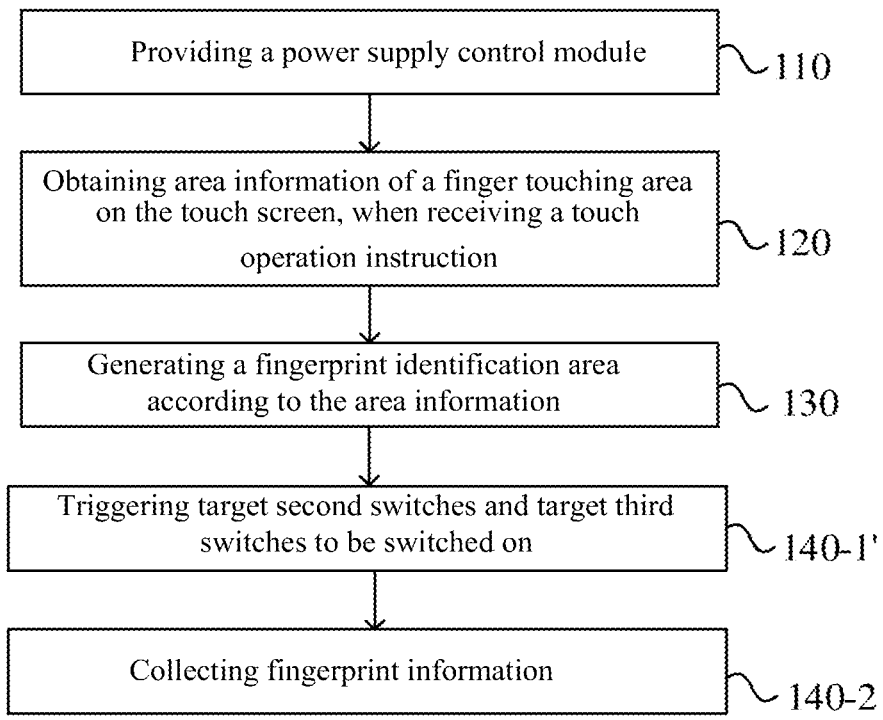
FIG. 9 is a flowchart for another radio frequency fingerprint identification method according to an embodiment of the present disclosure.

As shown in FIG. 9, in step 140, the step of triggering the power supply control module to supply power to the target fingerprint identification unit includes:

Step 140-1', triggering target second switches and target third switches to be switched on.

The target second switches are second switches corresponding to the target fingerprint identification units; and the target third switches are third switches corresponding to the target fingerprint identification units.

In this embodiment, separate control to the power supply of the fingerprint identification units by triggering the second switches and the third switches in a switch array to be switched on or off.

In this embodiment, the radio frequency fingerprint identification method further comprises:

counting the number of times that the second switches and the third switches are switched on within a threshold for time period, and control the second switches and the third switches to be normally on if the number of times is greater than a threshold for the number of time, and cancel the normally on if the number of times is less than or equal to the threshold for number of times. In this way, the power consumption for calculation and scheduling of the apparatus during the fingerprint identification process is reduced, and the overall power consumption is minimized.

Figure 10:
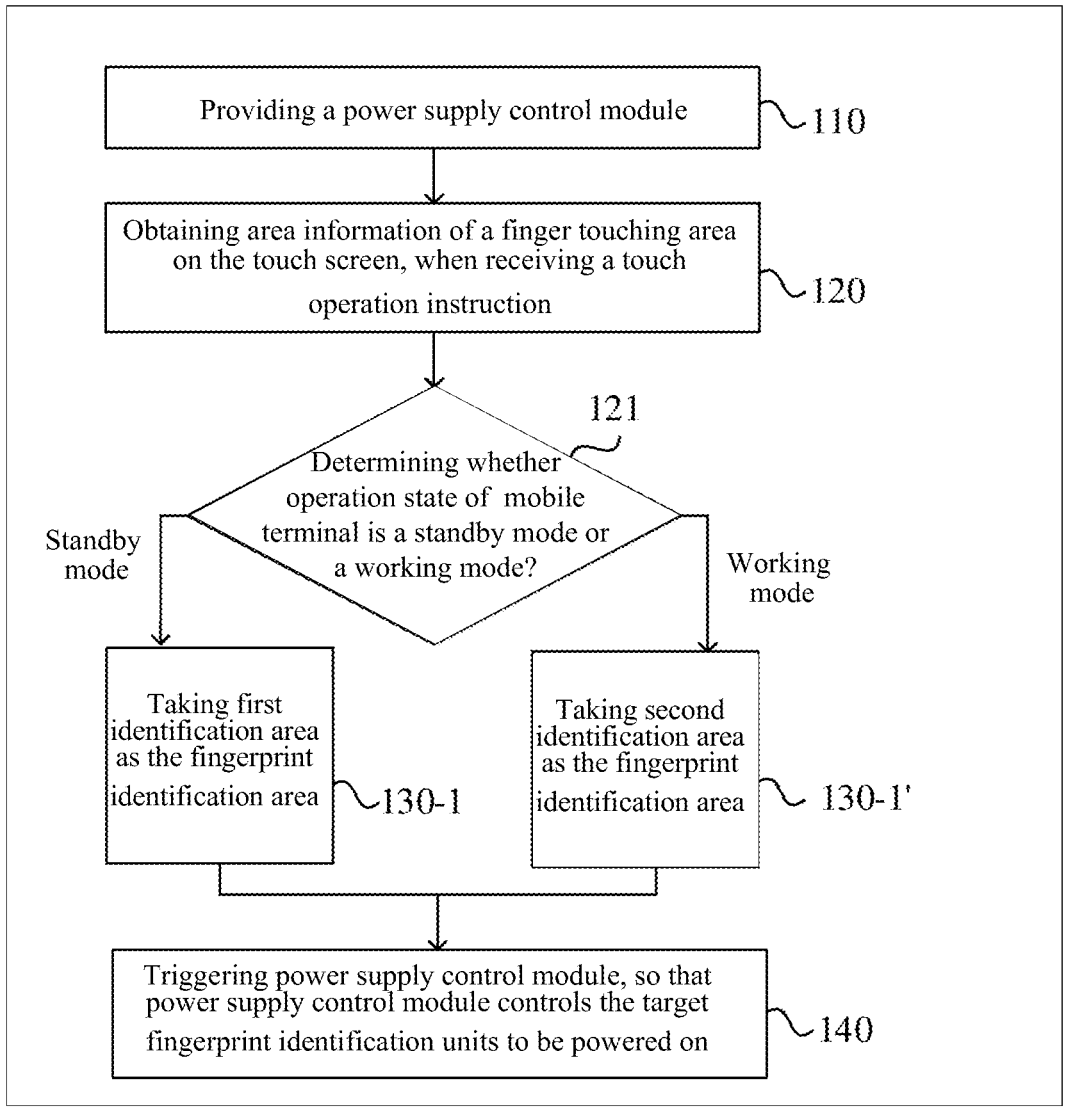
FIG. 10 is a flowchart for another radio frequency fingerprint identification method according to an embodiment of the present disclosure.

FIG. 10 is a flowchart of another radio frequency fingerprint identification method according to an embodiment of the present disclosure. As shown in FIG. 10, the embodiment is substantially the same as that of FIG. 7, except that the method in this embodiment further includes the following steps before step 130:

Step 121: determining whether the operation state of the mobile terminal is a standby mode or a working mode.

When it is determined that the operation state is a standby mode, step 130 specifically includes:

Step 130-1, taking a first identification area as the fingerprint identification area.

The fingerprint identification area corresponds to at least part of the plurality of fingerprint identification units; and the at least part of the plurality of fingerprint identification unit are defined as target fingerprint identification units. The area information includes coordinates of a midpoint of the finger touching area; the first identification area is an area extending outward from the coordinates of the midpoint, and a distance between the boundary of the first identification area and the coordinates of the midpoint is less than the first distance threshold.

When it is determined that the operation state is the working mode, step 130 specifically includes:

Step 130-1', taking a second identification area as a fingerprint identification area.

The fingerprint identification area corresponds to at least part of the plurality of fingerprint identification units; and the at least part of the plurality of fingerprint identification unit are defined as target fingerprint identification units. The area information includes an outer contour of a touching finger; the second identification area is a minimum area covering the outer contour.

The mode for obtaining the fingerprint identification area is selected based on the operation state of the mobile terminal, so that the overall power consumption in the fingerprint identification process can be minimized without affecting the accuracy of fingerprint identification.

Figure 11:
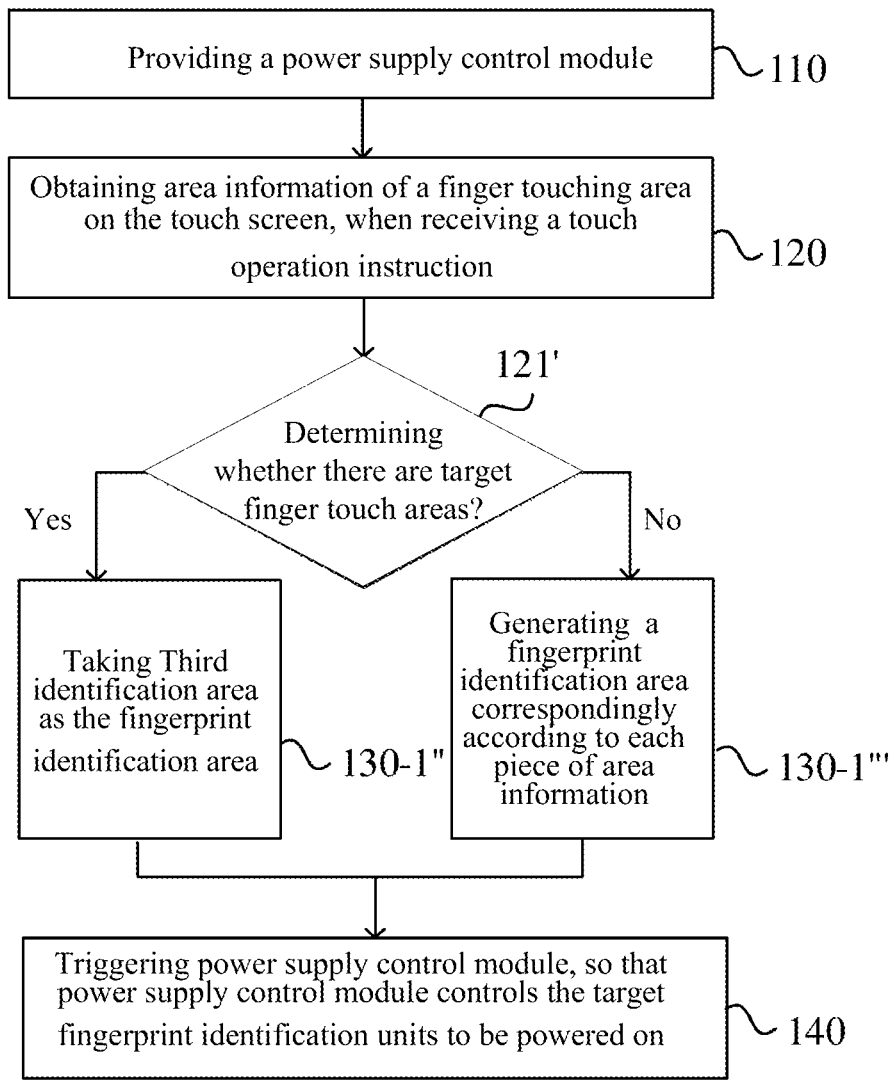
FIG. 11 is a flowchart for another radio frequency fingerprint identification method according to an embodiment of the present disclosure.

FIG. 11 is a flowchart for another radio frequency fingerprint identification method according to an embodiment of the present disclosure. The embodiment is substantially the same as that of FIG. 7, except that in this embodiment, area information of finger touching areas touched by at least two fingers are obtained at the same time; wherein the area information includes coordinates of midpoints of the finger touching areas. As shown in FIG. 11, the method further includes performing the following steps before step 130:

Step 121', determining whether there are target finger touch areas.

Wherein, the distance between the coordinates of the midpoints of two of the target finger touching areas is less than the second distance threshold.

If it is determined to be yes, step 130 specifically includes:

Step 131-1", taking a third identification area as the fingerprint identification area.

The third identification area is a minimum area covering at least two target finger touching areas.

If it is determined to be no, step 130 specifically includes:

Step 131-1''', generating a fingerprint identification area correspondingly according to each piece of area information.

The fingerprint identification area corresponds to at least part of the plurality of fingerprint identification units; and at least part of the plurality of fingerprint identification units are defined as target fingerprint identification units.

In this embodiment, when a multi-finger composite operation is performed, the finger touching areas may be combined into one fingerprint identification area if they are relatively close, so as to reduce power consumption for calculation and scheduling, and thus minimize the power consumption during the fingerprint identification process.

The present disclosure also includes a mobile terminal comprising a touch screen and a radio frequency fingerprint identification apparatus of any one of the embodiments 1-6. The mobile terminal of this embodiment can not only realize single-finger and multi-finger fingerprint identification on the touch screen, but also has low power consumption, which not only improves the user experience, but also has the advantages of energy saving.

While the embodiments of the present disclosure are described as above, those skilled in the art would understand that the description above are only illustrative, and the scope of the present disclosure is defined by the appended claims. Those skilled in the art may make various changes or modifications to the embodiments without departing from the principle and essential of the present disclosure, and such changes and modifications fall within the scope of the invention.

The invention claimed is:

1. A radio frequency fingerprint identification apparatus for a mobile terminal, wherein, the mobile terminal comprises a touch screen, the touch screen is configured to obtain area information of a finger touching area when receiving a touch operation instruction, and the radio frequency fingerprint identification apparatus includes a plurality of fingerprint identification units disposed under the touch screen, wherein the radio frequency fingerprint identification apparatus further includes: a power supply control module and a fingerprint identification control module;

the fingerprint identification control module is configured to receive the area information, and generate a fingerprint identification area according to the area information; wherein, the fingerprint identification area corresponds to at least part of the plurality of fingerprint identification units, and the at least part of the plurality of the fingerprint identification units are defined as target fingerprint identification units;

the fingerprint identification control module is further configured to trigger the power supply control module; the power supply control module is configured to control the target fingerprint identification units to be powered on so as to collect fingerprint information; and (i) wherein, the power supply control module comprises a power supply end, a grounding end and first switches, an input end of the fingerprint identification unit is electrically connected to one end of one of the first switches, the other end of the first switch is electrically connected to the power supply end, an output end of the fingerprint identification unit is electrically connected to the grounding end, and the fingerprint identification control module is specifically configured to trigger target first switches to be switched on, wherein, the target first switch are first switches corresponding to the target fingerprint identification units, the fingerprint identification control module is further configured to count the number of times that the first switches are switched on within a time period, and control the first switches to be on if the number of times is greater than a threshold for number of times and control the first switches to be off if the number of times is less than or equal to the threshold for number of times; or (ii) wherein, the power supply control module comprises a power supply end, a grounding end and first switches, an input end of the fingerprint identification unit is electrically connected to the power supply end, an output end of the fingerprint identification unit is electrically connected to one end of one of the first switches, the other end of the first switch is electrically connected to the grounding end, and the fingerprint identification control module is specifically configured to trigger target first switches to be switched on, wherein, the target first switch are first switches corresponding to the target fingerprint identification units, the fingerprint identification control module is further configured to count the number of times that the first switches are switched on within a time period, and control the first switches to be on if the number of times is greater than a threshold for number of times and control the first switches to be off if the number of times is less than or equal to the threshold for number of times; or (iii) wherein, the power supply control module comprises a power supply end, a grounding end, second switches and third switches, the plurality of fingerprint identification units are arranged in an array, output ends of the fingerprint identification units in each row are electrically connected to one end of one of the second switches, the other end of the second switch is electrically connected to the grounding end, input ends of the fingerprint identification units in each column are electrically connected to one end of one of the third switches, the other end of the third switch is electrically connected to the power supply end, and the fingerprint identification control module is specifically configured to trigger target second switches and target third switches to be switched on, and the target second switches are second switches corresponding to the target fingerprint identification units, and the target third switches are third switches corresponding to the target fingerprint identification units, the fingerprint identification control module is further configured to count the number of times that the second switches and the third switches are switched on within a time period, and control the second switches and the third switches to be on if the number of times is greater than a threshold for the number of time, and control the second switches and the third switches to be off if the number of times is less than or equal to the threshold for number of times; or (iv) wherein, the power supply control module comprises a power supply end, a grounding end, second switches and third switches, the plurality of fingerprint identification units are arranged in an array, input ends of the fingerprint identification units in each row are electrically connected to one end of one of the second switches, the other end of the second switch is electrically connected to the power supply end, output ends of the fingerprint identification units in each column are electrically connected to one end of one of the third switches, the other end of the third switch is electrically connected to the grounding end, and the fingerprint identification control module is specifically configured to trigger target second switches and target third switches to be switched on, the target second switches are second switches corresponding to the target fingerprint identification units, and the target third switches are third switches corresponding to the target fingerprint identification units, the fingerprint identification control module is further configured to count the number of times that the second switches and the third switches are switched on within a time period, and control the second switches and the third switches to be on if the number of times is greater than a threshold for the number of time, and control the second switches and the third switches to be off if the number of times is less than or equal to the threshold for number of times.

2. The radio frequency fingerprint identification apparatus according to claim 1, wherein the area information comprises coordinates of a midpoint of the finger touching area, the fingerprint identification control module is specifically configured to take a first identification area as the fingerprint identification area, wherein, the first identification area is an area extending outward from the coordinates of the midpoint, and a distance between any point on a boundary of the first identification area and the midpoint is less than a first distance threshold.

3. The radio frequency fingerprint identification apparatus according to claim 2, wherein the fingerprint identification control module is further configured to determine an operation state of the mobile terminal, and take the first identification area as the fingerprint identification area when it is determined that the operation state is a standby mode.

4. The radio frequency fingerprint identification apparatus according to claim 1, wherein the area information comprises an outer contour of a touching finger; the fingerprint identification control module is specifically configured to take a second identification area as the fingerprint identification area, the second identification area is a minimum area covering the outer contour.

5. The radio frequency fingerprint identification apparatus according to claim 4, wherein the fingerprint identification control module is further configured to determine an operating state of the mobile terminal, and take the second identification area as the fingerprint identification area when it is determined that the operating state is a working mode.

6. The radio frequency fingerprint identification apparatus according to claim 1, wherein, the touch screen is configured to obtain area information of at least two finger touching areas touched by at least two fingers at the same time, and the area information includes coordinates of midpoints of the finger touching areas;
the fingerprint identification control module is further configured to determine whether there are target finger touching areas, wherein a distance between the coordinates of the midpoints of two of the target finger touching areas is less than a second distance threshold, and take a third identification area as the fingerprint identification area if it is determined that the target finger touching areas exist, wherein, the third identification area is a minimum area covering at least two target finger touching areas.

7. The radio frequency fingerprint identification apparatus according to claim 1, wherein,
the touch screen includes a plurality of pixel units arranged in an array; and
at least one fingerprint identification unit is disposed under each of the pixel units.

8. A mobile terminal, comprising a radio frequency fingerprint identification apparatus according to claim 1.

9. A radio frequency fingerprint identification method for a mobile terminal, wherein the mobile terminal comprises a touch screen, and a plurality of fingerprint identification units are disposed under the touch screen, wherein the radio frequency fingerprint identification method comprises steps of:
providing a power supply control module;
obtaining area information of a finger touching area on the touch screen, when receiving a touch operation instruction;

generating a fingerprint identification area according to the area information, wherein, the fingerprint identification area corresponds to at least part of the plurality of fingerprint identification units, and the at least part of the plurality of the fingerprint identification units are defined as target fingerprint identification units; triggering the power supply control module, so that the power supply control module controls the target fingerprint identification units to be powered on so as to collect fingerprint information; and (i) wherein the power supply control module comprises a power supply end, a grounding end and first switches, an input end of the fingerprint identification unit is electrically connected to one end of one of the first switches, the other end of the first switch is electrically connected to the power supply end, an output end of the fingerprint identification unit is electrically connected to the grounding end; and the step of triggering the power supply control module specifically comprises: triggering target first switches to be switched on, wherein, the target first switch are first switches corresponding to the target fingerprint identification units, counting the number of times that the first switches are switched on within a time period, and controlling the first switches to be on if the number of times is greater than a threshold for number of times and controlling the first switches to be off if the number of times is less than or equal to the threshold for number of times; or (ii) wherein the power supply control module comprises a power supply end, a grounding end and first switches, an input end of the fingerprint identification unit is electrically connected to the power supply end, an output end of the fingerprint identification unit is electrically connected to one end of one of the first switches, and the other end of the first switch is electrically connected to the grounding end; and the step of triggering the power supply control module specifically comprises: triggering target first switches to be switched on, wherein, the target first switch are first switches corresponding to the target fingerprint identification units, counting the number of times that the first switches are switched on within a time period, and controlling the first switches to be on if the number of times is greater than a threshold for number of times and controlling the first switches to be off if the number of times is less than or equal to the threshold for number of times; or (iii) wherein, the power supply control module comprises a power supply end, a grounding end, second switches and third switches, the plurality of fingerprint identification units are arranged in an array, output ends of the fingerprint identification units in each row are electrically connected to one end of one of the second switches, the other end of the second switch is electrically connected to the grounding end, input ends of the fingerprint identification units in each column are electrically connected to one end of one of the third switches, and the other end of the third switch is electrically connected to the power supply end; and the step of triggering the power supply control module specifically comprises: triggering target second switches and target third switches to be switched on, and the target second switches are second switches corresponding to the target fingerprint identification units and the target third switches are third switches corresponding to the target fingerprint identification units, counting the number of times that the second switches and the third switches are switched on within a time period, and controlling the second switches and the third switches to be on if the number of times is greater than a threshold for the number of time and controlling the second switches and the third switches to be off if the number of times is less than or equal to the threshold for number of times; or (iv) wherein, the power supply control module comprises a power supply end, a grounding end, second switches and third switches, and the plurality of fingerprint identification units are arranged in an array, input ends of the fingerprint identification units in each row are electrically connected to one end of one of the second switches, the other end of the second switch is electrically connected to the power supply end, output ends of the fingerprint identification units in each column are electrically connected to one end of one of the third switches, and the other end of the third switch is electrically connected to the grounding end; the step of triggering the power supply control module specifically comprises: triggering target second switches and target third switches to be switched on; and the target second switches are second switches corresponding to the target fingerprint identification units; and the target third switches are third switches corresponding to the target fingerprint identification units, counting the number of times that the second switches and the third switches are switched on within a time period, and controlling the second switches and the third switches to be on if the number of times is greater than a threshold for the number of time and controlling the second switches and the third switches to be off if the number of times is less than or equal to the threshold for number of times.

10. The radio frequency fingerprint identification method according to claim 9, wherein the area information comprises coordinates of a midpoint of the finger touching area,
the step of generating a fingerprint identification area according to the area information specifically comprises:
taking a first identification area as the fingerprint identification area, wherein, the first identification area is an area extending outward from the coordinates of the midpoint, and a distance between any point on a boundary of the first identification area and the midpoint is less than a first distance threshold.

11. The radio frequency fingerprint identification method according to claim 10, further comprises performing the following steps before generating a fingerprint identification area according to the area information: determining an operation state of the mobile terminal, and taking the first identification area as the fingerprint identification area when it is determined that the operation state is a standby mode.

12. The radio frequency fingerprint identification method according to claim 9, wherein the area information comprises an outer contour of a touching finger;
the step of generating a fingerprint identification area according to the area information specifically comprises taking a second identification area as the fingerprint identification area, wherein, the second identification area is a minimum area covering the outer contour.

13. The radio frequency fingerprint identification method according to claim 12, further comprises performing the following step before generating a fingerprint identification area according to the area information: determining an operating state of the mobile terminal, and taking the second identification area as the fingerprint identification area when it is determined that the operating state is a working mode.

14. The radio frequency fingerprint identification method according to claim 9, further comprising obtaining area information of at least two finger touching areas touched by at least two fingers at the same time, wherein the area information includes coordinates of midpoints of the finger touching areas;

wherein, the method further comprises performing the following steps before the step of generating a fingerprint identification area according to the area information:

determining whether there are target finger touching areas, wherein a distance between the coordinates of the midpoints of two of the target finger touching areas is less than a second distance threshold, and taking a third identification area as the fingerprint identification area if it is determined that the target finger touching areas exist, wherein, the third identification area is a minimum area covering at least two target finger touching areas.

* * * * *